United States Patent
Ohlsson (10) Patent No.: US 10,273,931 B2
(45) Date of Patent: Apr. 30, 2019

(54) WAVE POWER STATION

(71) Applicant: OLCON ENGINEERING AB, Kil (SE)

(72) Inventor: Johnny Ohlsson, Kil (SE)

(73) Assignee: OLCON ENGINEERING AB, Kil (SE)

( * ) Notice: Subject to any disclaimer, the term of this patent is extended or adjusted under 35 U.S.C. 154(b) by 0 days.

(21) Appl. No.: 15/562,440

(22) PCT Filed: Mar. 29, 2016

(86) PCT No.: PCT/SE2016/000014
§ 371 (c)(1),
(2) Date: Sep. 28, 2017

(87) PCT Pub. No.: WO2016/159854
PCT Pub. Date: Oct. 6, 2016

(65) Prior Publication Data
US 2018/0100481 A1    Apr. 12, 2018

(30) Foreign Application Priority Data
Mar. 30, 2015    (SE) ...................................... 1530038

(51) Int. Cl.
*F03B 13/10*    (2006.01)
*F03B 13/12*    (2006.01)
(Continued)

(52) U.S. Cl.
CPC .......... *F03B 13/1885* (2013.01); *F03B 13/20* (2013.01); *F05B 2240/40* (2013.01); *F05B 2260/42* (2013.01); *Y02E 10/38* (2013.01)

(58) Field of Classification Search
CPC ... F05B 2240/40; F03B 13/1855; F03B 13/20
(Continued)

(56) References Cited

U.S. PATENT DOCUMENTS 4,341,959 A * 7/1982 Ambli ................... F03B 13/147
                                                      290/42
4,363,213 A * 12/1982 Paleologos ......... F03B 13/1855
                                                      290/53
(Continued)

FOREIGN PATENT DOCUMENTS

KR       20120104880 A  *  9/2012
WO    WO 2009105011 A1  *  8/2009
WO    WO 2010078940 A2  *  7/2010

OTHER PUBLICATIONS

International Search Report (dated Jun. 10, 2016) for corresponding Internattonal App. PCT/SE2016/000014.

*Primary Examiner* — Tulsidas C Patel
*Assistant Examiner* — Thomas K Quigley
(74) *Attorney, Agent, or Firm* — WRB-IP LLP (57) ABSTRACT

A wave power station for conversion and storage of energy from waves in an ocean or a sea includes a wave energy absorbing unit including a first floating body connected to a vertically hanging counterweight via a drive line and a drive wheel, a power generating unit including at least one power generation unit for conversion of wave energy, connected to a drive shaft, and a power accumulating unit including at least one power accumulator for storage of generated wave power. The power generating unit and the power accumulating unit are arranged in a second floating body firmly anchored under the first floating body to the ocean bed or sea bed. The drive line is connected to the at least one power generation unit via the drive wheel, and a coupling and transmission unit arranged on the drive shaft for driving of the at least one power generation unit via the up and down movements of the drive line in time with the wave movements.

10 Claims, 5 Drawing Sheets

(51) Int. Cl.
*F03B 13/18* (2006.01)
*F03B 13/20* (2006.01)

(58) Field of Classification Search
USPC .................................................. 290/45, 53
See application file for complete search history.

(56) References Cited

U.S. PATENT DOCUMENTS

| | | | | |
|---|---|---|---|---|
| 4,447,740 A * | 5/1984 | Heck | ................. | F03B 13/22 290/53 |
| 5,066,867 A | 11/1991 | Shim | | |
| 5,411,377 A * | 5/1995 | Houser | ................. | F03B 13/1855 417/333 |
| 5,929,531 A * | 7/1999 | Lagno | ................. | F03B 13/262 290/42 |
| 6,768,216 B1 * | 7/2004 | Carroll | ................. | F03B 13/148 290/42 |
| 7,476,137 B2 * | 1/2009 | Stewart | ................. | F03B 13/1815 290/42 |
| 8,330,287 B2 * | 12/2012 | Larivain | ................. | F03B 13/1845 290/42 |
| 8,745,981 B1 * | 6/2014 | Hanna | ................. | F03B 13/1855 60/398 |
| 2005/0099010 A1 * | 5/2005 | Hirsch | ................. | F03B 13/1845 290/42 |
| 2008/0217921 A1 | 9/2008 | Raftery | | |
| 2008/0309088 A1 * | 12/2008 | Agamloh | ................. | F03B 13/1845 290/53 |
| 2009/0072540 A1 * | 3/2009 | McCague | ................. | F03B 13/186 290/53 |
| 2010/0025993 A1 | 2/2010 | Raftery | | |
| 2010/0032950 A1 * | 2/2010 | Akervoll | ................. | F03B 13/1885 290/53 |
| 2010/0092242 A1 | 4/2010 | Rasmussen | | |
| 2010/0102563 A1 * | 4/2010 | Akervoll | ................. | F03B 13/1885 290/53 |
| 2010/0164227 A1 * | 7/2010 | Grassi | ................. | F03B 13/20 290/52 |
| 2010/0207392 A1 * | 8/2010 | Bender | ................. | F03B 13/186 290/53 |
| 2010/0219633 A1 * | 9/2010 | Sichau | ................. | F03B 13/1855 290/42 |
| 2010/0259047 A1 * | 10/2010 | Chi | ................. | F03B 13/1855 290/53 |
| 2011/0012358 A1 * | 1/2011 | Brewster | ................. | F03B 13/1855 290/53 |
| 2011/0089696 A1 * | 4/2011 | Davis | ................. | F03B 13/1865 290/53 |
| 2011/0278848 A1 * | 11/2011 | Gimsa | ................. | F03B 13/1855 290/53 |
| 2012/0139261 A1 * | 6/2012 | Dick | ................. | F03B 13/20 290/1 C |
| 2013/0200626 A1 * | 8/2013 | Sidenmark | ................. | F03B 13/1885 290/53 |
| 2014/0152015 A1 | 6/2014 | Sidenmark et al. | | |

* cited by examiner

WAVE POWER STATION

BACKGROUND AND SUMMARY

The present invention relates to a wave power station for conversion and storage of wave energy.

Wave energy, also termed blue energy, constitutes a substantially unexploited energy source for extraction of environmentally friendly and renewable energy in the form of electric power. Extraction of energy from sea waves via wave power stations is the method which has greatest potential compared with other methods based on tidal differences, temperature differences or differences in salt water concentration. Sea waves contain 15-20 times more energy per square meter compared with wind and sun. According to the IEA, the global potential for wave energy is between 8,000 and 80,000 TWh. By utilizing a small part of the potentially available wave energy, the switch from present-day fossile-based power production to an environmentally friendly renewable electric power production based on wave energy, can be strongly accelerated.

Problems which must be borne in mind in the design of a wave power station include wear and tear or damage which can occur due to flowing water and corrosive environment, or due to collision with ships, etc. Even if the environmental consequences of a wave power station for the environment are considered small, possible negative effects on the marine systems must be borne in mind. A further problem which should be borne in mind is the high investment costs.

According to recently published British compilations, the cost, today, of a full-scale prototype lies at between 70,000 and 100,000 Swedish Kr/kW. A 10 MW wave power farm is deemed to cost between 500-600 million (50,000-60,000 Kr/kW) according to the same source.

A few different types of wave power stations exist, e.g. wave power stations based on so-called oscillating water cylinders (OWC). An OWC is an air reservoir, usually a vertically upright cylinder, which is open on the bottom side toward the water surface and which has an air outlet via a turbine on the top side of the cylinder. When a wave strikes the cylinder, the water level in the cylinder rises, whereupon air inside the cylinder is compressed so that the air pressure drives the turbine.

Another common type of wave power station is based on the coupling together of many floating bodies, so-called multisegment structures, which are arranged at right angles to incoming waves. The floating bodies are coupled together via articulated joints, which allow the floating bodies to move relative to one another. The relative movements of the floating bodies, which movements are concentrated in the articulated joints between the floating bodies, are utilized for the pressurization of hydraulic pistons, which drive a fluid through a motor, which in turn drives an electric generator.

A third type of wave power station utilizes the energy in up and down movements in a floating body through the use of an arrangement of drive lines coupled between the floating body and an anchorage point and/or a counterweight via one or more power generating arrangements, e.g. electric generators for production of electric current.

Figure 1:
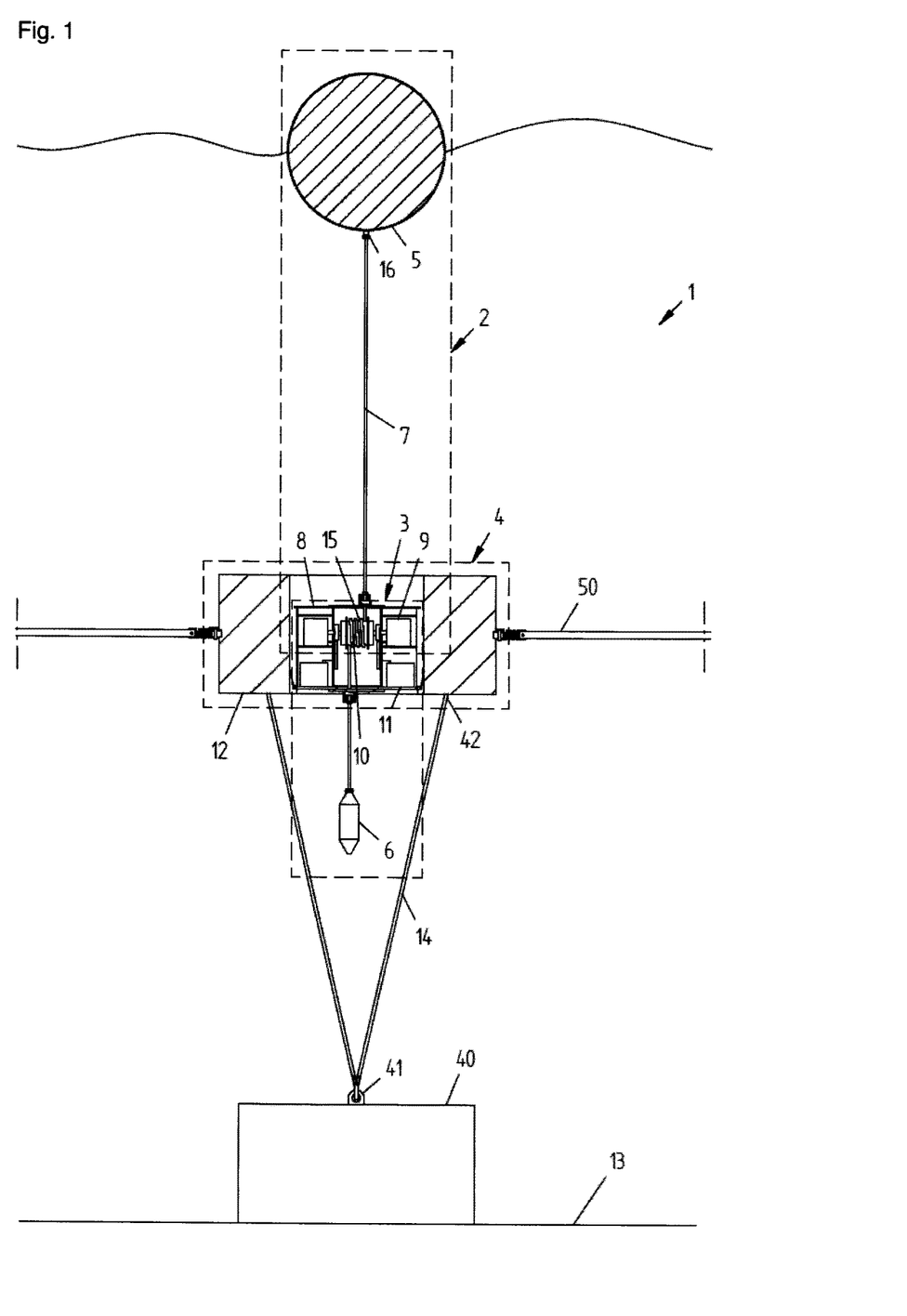
FIG. 1 shows schematically a wave power station for absorption, conversion and storage of wave energy, comprising an energy absorbing unit, comprising a first floating body connected to a counterweight via a drive line, and a power generating unit for production of power from absorbed wave energy, as well as a power accumulating unit for storage of produced power, wherein the power generating unit and the power accumulating unit are arranged in an insulated container in a second firmly anchored floating body under the first floating body.

In patent document US 2014152015 A1, FIG. 1, a wave power station of the last-named type is described. The wave power station 10, FIG. 1, comprises an energy absorbing unit 100, an energy accumulating unit 200 and a power generating unit 300, arranged in a surface-based floating body 20. Via a drive line 32, and a rotor drum 120 in the energy absorbing unit 100, the surface-based floating body 20 is connected to a bottom foundation 30, alternatively to an anchoring buoy 30a, 30b.

Via a second drive line 42 and a second rotor drum 40 in the power accumulating unit 200, the surface-based floating body 20 is also connected to a counterweight 40. The driving of the two power generating rotor drums 120,230 is determined by the up and down movement of the floating body 10 relative to the bottom foundation 30 and relative to the counterweight 40.

One problem with said wave power station is the large inertia of the floating body, which implies low or zero degree of utilization of the wave power station in case of low wave height.

A further problem is the arrangement of drive lines between the two power generating rotor drums 120, 230 and the bottom foundation 30 or the counterweight 40, which makes the wave power station complex.

A further problem is that the wave power station has no facility for intermediate storage of energy in order to even out variations in wave height/wave intensity.

It is desirable to provide a wave power station having a high degree of utilization even in case of small to medium-high wave height/wave intensity.

It is also desirable to provide:

a wave power station having a facility for intermediate storage of wave energy/power so as to even out variations in the power production in case of variations in wave height/wave intensity, a single wave power station having few moving parts, which can be easily maintained, a wave power station which can be easily coupled together with other wave power stations to form larger wave power systems, a wave power station adapted to harsh environments, incl. corrosion from seawater.

Thus, according to an aspect of the present invention, a wave power station having a high degree of utilization in case of small to medium-size waves, for conversion and storage of wave energy from a water system, for example oceans, seas, rivers, has been provided.

According to a first preferred embodiment of an aspect of the invention, the wave power station comprises: an energy absorbing unit comprising a first floating body connected to a vertically hanging counterweight via a drive line and a drive wheel, a power generating unit comprising at least one power generation unit, for conversion of wave energy, connected to a drive shaft, and a power accumulating unit comprising at least one power accumulator for storage of converted wave energy, wherein the power generating unit and the power accumulating unit are arranged in a central cavity in a toroidal second floating body firmly anchored under the first floating body, wherein the drive line is connected to said at least one power generation unit via the drive wheel and a coupling and transmission unit arranged on the drive shaft for driving of said at least one power generation unit, wherein said at least one power generation unit comprises two opposite-acting electric generators, with opposite direction of rotation relative to each other, arranged on the drive shaft, for alternate generation of electric current via the up and down movements of the drive line in time with the wave movements, wherein the drive shaft, the drive wheel, the switching and transmission unit, said at least one power generation unit and said at least one power accumulator are arranged in a container in the central cavity of the toroidal second floating body, and wherein said at least one power accumulator comprises at least two chargeable battery cells for storage of electric current from the two opposite-acting electric generators.

Further preferred embodiments are defined below:

According to a second preferred embodiment, the drive shaft, the coupling and transmission unit and the drive wheel are arranged in a bearing housing, fixedly mounted in the container.

According to a third preferred embodiment, the container is loosely arranged and rests on a seat disposed on the lower part of the inner envelope surface of the central cavity, via a flange on the lower end of the container.

According to a fourth preferred embodiment, said at least one power generation unit comprises two opposite-acting compression pumps for compression of air.

According to a fifth preferred embodiment, said at least one power accumulator comprises three outer pressure vessels for storage of compressed air, wherein the three outer pressure vessels are arranged in the toroidal part of the second floating body.

According to a sixth preferred embodiment, the three outer pressure vessels comprise watertight elastic inner pressure vessels for storage of the compressed air.

According to a seventh preferred embodiment, the three outer pressure vessels are separated from one another by three floating containers, comprising floating elements, comprising cellular plastic.

According to an eighth preferred embodiment, the drive line is rotatably mounted on the bottom side of the first floating body via a rotating coupling.

According to a ninth preferred embodiment, the second floating body is firmly anchored to a bottom foundation on the ocean bed or sea bed via at least one anchoring wire.

According to a tenth preferred embodiment, one end of the anchoring wire is fixedly arranged on a first point of attachment on the bottom side of the second floating body, and the other end is detachably arranged on a second point of attachment disposed on the top side of the second floating body, wherein the anchoring wire runs from the first point of attachment to the second point of attachment via an eye bolt disposed on the concrete foundation and via a guide hole in one of the floating containers.

The invention implies, according to aspects thereof, a number of advantages and effects, the most important of which are:

The wave power station has a high degree of utilization even in case of low to medium-high wave height/wave intensity, which means that the wave power station can be in operation the whole time, apart from when there is absolute calm.

The wave power station is of flexible and modular construction, which means:

that the number of power generating parts can be easily varied and exchanged, that the wave power station can be easily coupled together with other wave power stations to form larger or smaller wave power station systems with regard to factors such as site access, electric power requirements and environment.

The design of the wave power station enables intermediate storage of wave energy in case of variations in wave height/intensity, for example in the form of electric current in chargeable batteries or in the form of compressed air in pressure vessels.

The wave power station comprises no parts above water level which can damage animal life, cause noise or otherwise be disturbing, or pose a risk to activities on the water surface.

The wave power station is maintenance-friendly, since no underwater or high-level works are required. Maintenance works are carried out on the water surface, in that the anchorage of the wave power station to a bottom foundation can be released, whereupon the wave power station is hoisted to sea level under controlled conditions. The wave power station can thereby, indeed, be easily moved or scrapped on the day this becomes an issue.

The wave power station is in principle independent of sea depth, which means that the wave power station can be placed where wave conditions are best.

BRIEF DESCRIPTION OF THE DRAWINGS

The invention has been defined in the following patent claims and will now be described in somewhat greater detail in connection with the appended figures.

Further advantages and effects will emerge from a study and consideration of the following, detailed description of the invention with simultaneous reference to the appended ten drawing figures, FIG. 1 to FIG. 10, in which.

DETAILED DESCRIPTION

Figure 2:
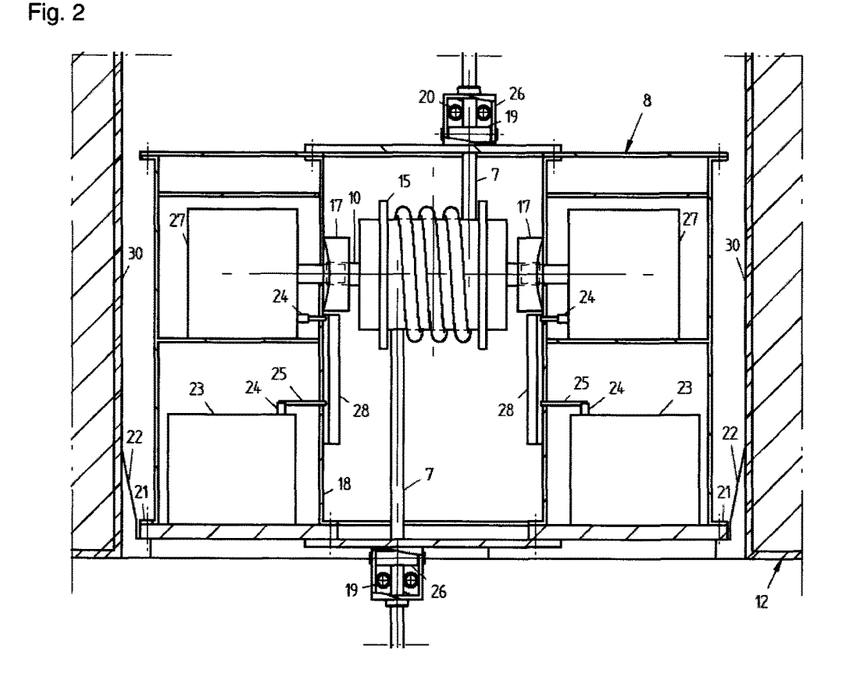
FIG. 2 shows schematically an axial section, viewed from the side, of the insulated container according to FIG. 1, wherein the connection of the drive line and of the drive wheel to the electric generators, as well as the placement of the battery cells in the insulated container, can be seen.
Figure 3:
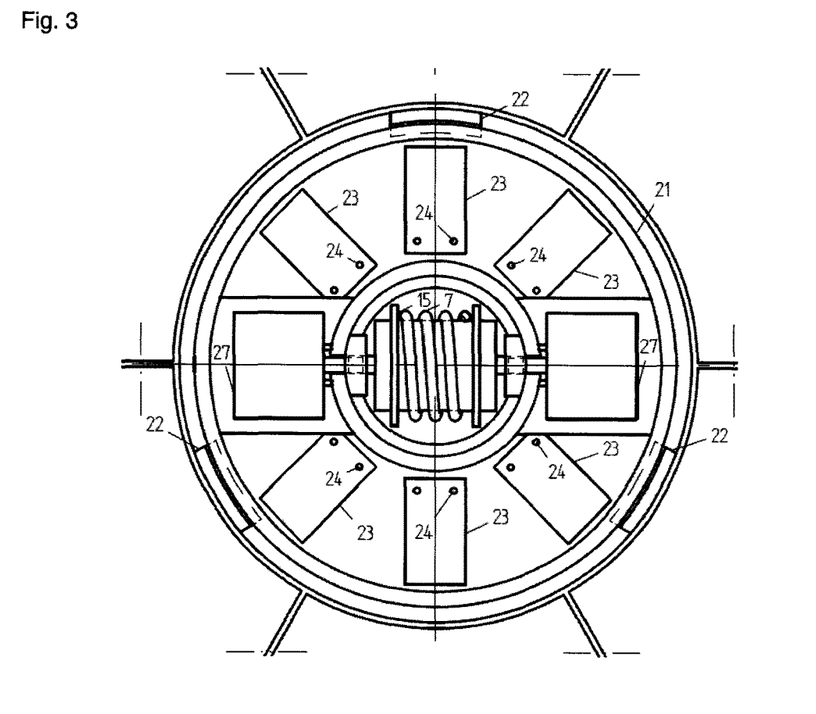
FIG. 3 shows schematically a radial section, viewed from above, of the watertight container according to FIG. 2.

FIGS. 1-3 show a wave power station 1 according to the invention designed for use in isolation or in combination with other wave power stations. The wave power station 1 comprises an energy absorbing unit 2, a power generating unit 3 and a power accumulating unit 4, also termed an energy accumulating unit, for conversion and storage of wave energy.

The energy absorbing unit 2 comprises a first surface-based floating body 5, also termed a float, preferably configured as an elastic sphere and made of hard plastic in order to cope with corrrosive sea or ocean environment. Alternatively, the floating body 5 can be made of a rustproof metal, for example stainless steel.

The first floating body 5 is connected to a vertically hanging counterweight 6 via a drive line 7. The drive line 7 is connected to the power generating unit 3 via a drive wheel 15.

The power generating unit 3 comprises at least one power generation unit 9, which in a first embodiment of the wave power station 1, FIGS. 2 and 3, is constituted by two opposite-acting electric generators 27, the rotor shafts of which are connected to a drive shaft 10, which, via the drive wheel 15 and the movements of the drive line 7, drives the two opposite-acting electric generators 27.

To the drive shaft 10 is fitted a mechanical coupling and transmission unit 17 arranged such that the two opposite-acting electric generators 26 are driven, alternately, by the up and down movements of the drive line 7, in time with the wave movements of the sea. The coupling and transmission unit 17, which is of standard type, is not described in greater detail in the continued text.

By two opposite-acting electric generators 27 is here meant two electric generators, the rotor shafts of which have an opposite direction of rotation relative to each other in order to generate rectified current and voltage from the two electric generators 27 upon the alternate connection and disconnection of the two electric generators 27.

In an alternative embodiment (not shown) of the connection and disconnection of the two electric generators 27, there are arranged two diode switches, also termed power diodes, on the output of the respective electricity generator 27. Diode switches, which are voltage-controlled, register the voltage for the respective electric generator 27 and disconnect and respectively connect the electric generators 27 when the voltage of the electric generators 27 falls or rises toward a predetermined value close to zero volt.

The power accumulating unit 4 comprises at least one power accumulator 11. The power generating unit 3 and the power accumulating unit 4 are arranged in a second floating body 12, arranged under the first floating body 5.

The second floating body 12 is firmly anchored to the ocean bed or sea bed 13 via at least one anchoring wire 14 or chain.

The second floating body 12 is annular or toroidal, preferably with square cross section, wherein the power generating unit 3 and the power accumulating unit 4 are arranged in a substantially watertight, insulated and preferably cylindrical container 8 in the central cavity 29 of the second floating body 12. In a second embodiment, FIGS. 4 and 5, the power accumulating unit 4 is arranged inside the toroidal part of the floating body 12.

According to an alternative embodiment, the power accumulating unit 4 is arranged both in the central cavity 29 of the floating body 12 and in the toroidal part of the floating body 12.

The second floating body 12 is made of a corrosion-resistant material, preferably a plastics or composite material, e.g. polyethylene. Alternatively, the second floating body 12 is made of a metallic material, e.g. steel or aluminum.

The drive shaft 10, the coupling and transmission unit 17 and the drive wheel 15 are arranged in a bearing housing 18, axially mounted in the watertight cylindrical container 8 in the central cavity 29. The two opposite-acting electric generators 27 are connected to the drive shaft 10 via the coupling and transmission unit 17, which controls the two electric generators 27 in time with the up and down movements of the drive line 7, so that the two electric generators 27 are alternately connected and disconnected each time the direction of rotation of the drive shaft 10 changes.

The watertight insulated container 8 is loosely arranged on a seat 22 on the lower part of the inner envelope surface 30 of the central cavity 29 and rests on the seat 22 via a flange 21 disposed on the lower end of the watertight container 8.

In order to prevent rotary or rotation forces from being transmitted from the first floating body 5 to the drive wheel 15, via the drive line 7, the drive line 7 is rotatably mounted on the bottom side of the first floating body 5 via a stainless steel rotating coupling 16.

The passage of the drive line 7 to and from the bearing housing 18 runs via two bushings in the watertight container 8 and via two, substantially watertight packing housings 26 arranged on the top side and the bottom side of the connection of the watertight container 8 to the two bushings. The packing housings 26 comprise two roller bearings 19, 20 for guidance and fixing of the drive line 7 in the horizontal plane (the XY plane). The first roller bearing 19 guides the drive line 7 in the x-direction, and the second roller bearing 19, arranged above the first roller bearing 20 in the packing housing 26, guides the drive line 7 in the y-direction, perpendicular to the x-direction.

The drive line 7 is preferably made of a corrosion-resistant synthetic material, e.g. nylon, plastic or carbon fiber. Alternatively, the drive line 7 is constituted by a stainless steel wire.

The power accumulating unit 4 comprises at least one power accumulator 11, which according to the first embodiment, FIGS. 2 and 3, is constituted by at least two, preferably eight, serially connected and/or parallelly connected chargeable battery cells 23 for storage of generated electric power from the two opposite-acting electric generators 27. The at least two chargeable battery cells 23, which preferably are of standard type, are arranged adjacent to the two electric generators 27 in the watertight container 8.

The electric generators 27 are connected to the battery cells 23 via electric cables 25, connectors 24 and a voltage-controlled governor unit 28. The distribution of charging current to the battery cells 23 is controlled via the voltage-controlled governor unit 28.

Figure 4:
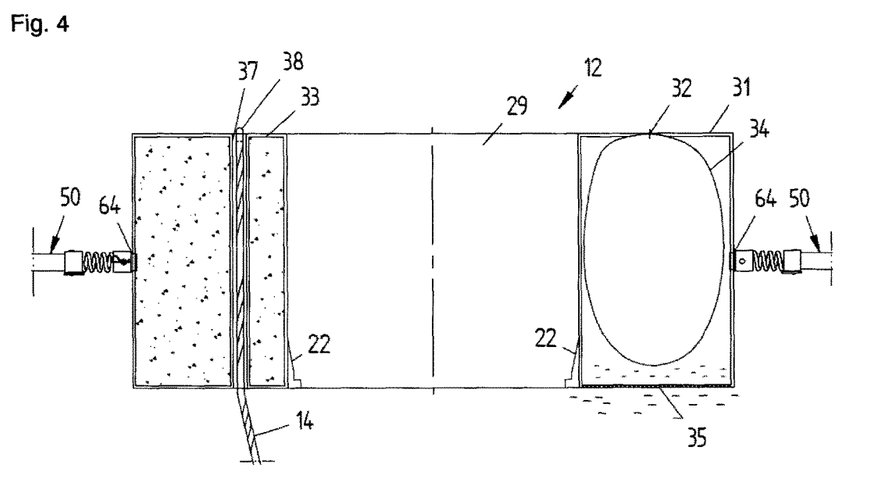
FIG. 4 shows schematically an axial section, viewed from the side, of the second toroidal floating body according to FIG. 1, wherein the configuration of the compressed air vessels and the fastening of the anchoring wire can be seen.
Figure 5:
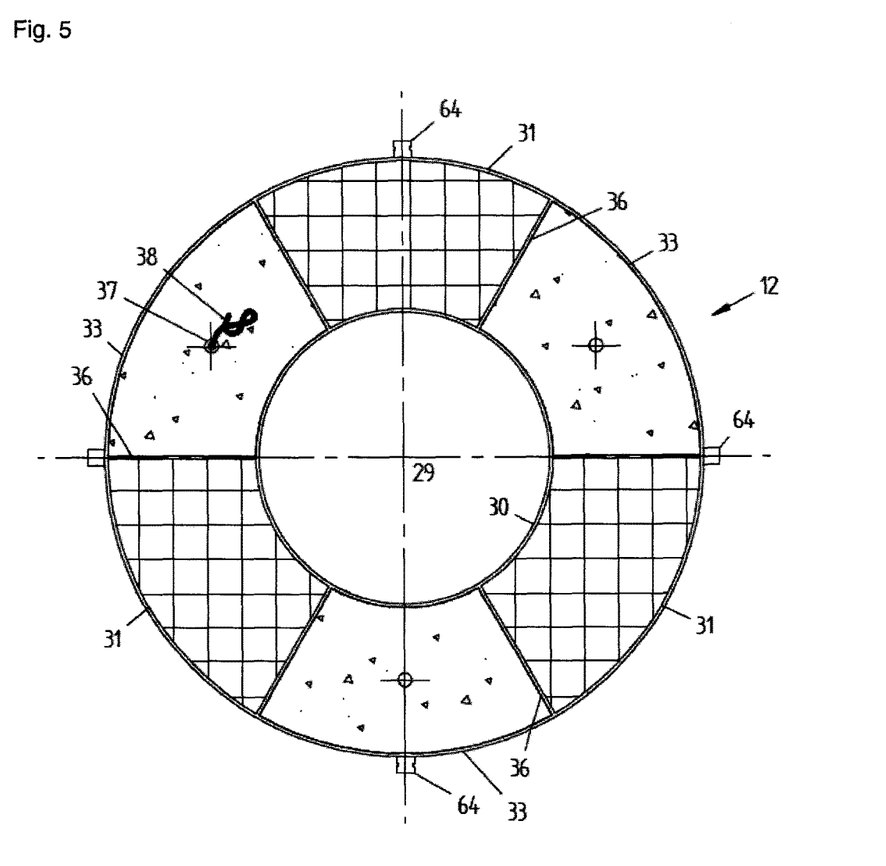
FIG. 5 shows schematically a radial section, viewed from above, of the second floating body according to FIG. 4.

On the side of the second floating body 12 there is arranged one or more watertight electric sockets in a coupling sleeve 64 to which external electric cables 51 can be connected, FIGS. 4-5. Via the external electric cables 51, electric power can be distributed to an external electricity supply network for onward distribution to electricity consumers, or to an external storage unit for storage of electric power.

In a wave power station system consisting of or comprising a considerable number of coupled-together wave power stations 1, said electric sockets can also be used to even out variations in the electric power production between the individual wave power stations 1.

For external storage of electric power, large battery units arranged in watertight containers on land, or in towers firmly anchored out at sea, are expediently used.

In a second embodiment of the power generation unit 9, the power generation unit 9 comprises two opposite-acting compression pumps (not shown) for compression of a fluid, for example air or water, preferably air. The two opposite-acting compression pumps are connected to and driven by the drive shaft 10 in corresponding manner to the two opposite-acting electric generators 27 in the first embodiment.

In a third embodiment (not shown), the power generation unit 9 comprises an opposite-acting electric generator 27 and an opposite-acting compression or hydraulic pump for compression of air and for generation of electricity. The electric generator 27 and the compression pump are connected to and driven by the drive shaft 10 in corresponding manner to the two opposite-acting electric generators 27 in the first embodiment.

In a fourth embodiment of the power generation unit 9 (not shown), the power generation unit 9 comprises a linear electric generator, which is driven by a piston connected to a second drive wheel on the drive shaft, wherein the linear movement of the piston, via a coupling unit, drives the linear generator periodically in time with the up and down movement of the drive line. For direct transfer of electric power to an external electricity supply network, a direct-current and alternating-current converter is also provided.

In a fifth embodiment of the power generation unit 9 (not shown), the power generation unit 9 comprises a linear compression or hydraulic pump for production of compressed air, which is driven by the linear movement of a piston in corresponding manner to in the fourth embodiment.

The compressed air is stored in one or more, preferably three, pressure vessels 31, which are arranged in the power accumulating unit 4 in the toroidal part of the second floating body 12, FIGS. 4 and 5.

The pressure vessels 31 are filled via governor-controlled compressed air lines 32 arranged between the compression pumps and the pressure vessels 31, wherein the compressed air flow from the compression pumps to the pressure vessels 31 is controlled/regulated via pressure-controlled governor units (not shown).

Figure 8:
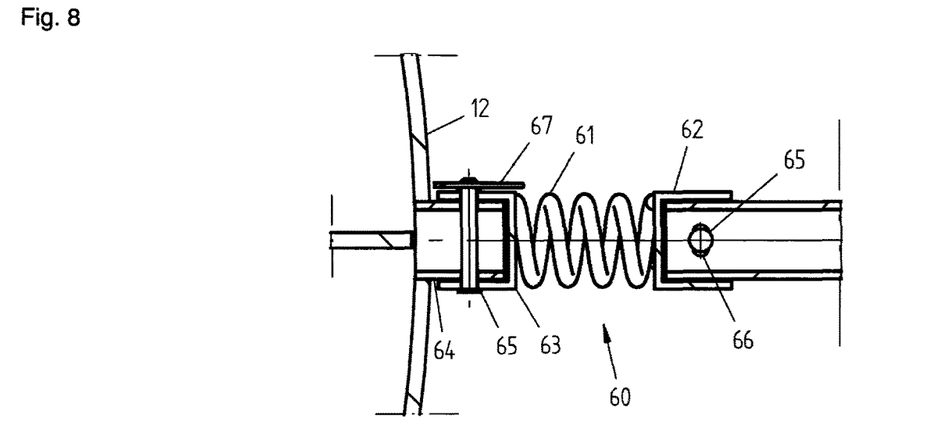
FIG. 8 shows schematically an axial section, viewed from the side, of the flexible pipe coupling according to FIG. 7, wherein the configuration of the pipe coupling with helical spring and locking pins can be seen.

For storage of compressed air in external storage units, watertight compressed air sockets are arranged in coupling sleeves 64 disposed on the side of the second floating body 12, to which one or more external compressed air lines 52 can be connected, FIGS. 4,5 and 8.

For storage of larger quantities of compressed air, preferably large flexible pressure vessels (not shown), which can be constituted, for example, by plastics, rubber or metal balloons, firmly anchored to the sea bed, for example at 50 m depth, are used. With this storage method, large quantities of pressurized air can be stored at constant pressure. For storage of pressurized water, floating tanks, which are firmly anchored to the sea bed via wires or chains, are expediently used. Alternatively, water tanks can be placed on land-based or in sea-based towers.

Adjacent to the storage units are also arranged electric turbines for production of electric power.

The pressure vessels 31 are arranged in the toroidal second floating body 12 in that the toroidal part of the floating body 12 is sectioned in the form of cake slices separated from one another by vertical partitions 36, wherein the partitions 36 are mounted at regular distances apart, FIGS. 4 and 5. Preferably, six vertical partitions 36, evenly distributed around the toroidal part so that six containers are formed in total, are used. Three of the six containers are utilized as pressure vessels 31, and the other three containers are used as floating containers 33. The three floating containers 33 are filled with a floating material, preferably comprising cellular plastic.

In a second embodiment of the pressure vessel 31, also termed the outer pressure vessel 31, the outer pressure vessels 32 contain inner flexible pressure vessels 34, made of a watertight plastics or rubber material. In said second embodiment of the pressure vessel 31, the outer pressure vessel 31 is open on the bottom side toward the water, apart from a fine-mesh net 35, the function of which is to prevent an influx of animals and loose material, such as fishes and other animals, into the pressure vessel 32.

The second floating body 12 is firmly anchored to the bottom foundation 40 on the sea bed 13 via at least one anchoring wire 14 or chain, FIG. 1.

The second floating body 12 is also arranged so that it can be easily raised to the surface whenever there is a need for maintenance, in that the anchoring wire(s) 14 of the floating body 12 can be easily released from the bottom foundation 40 via a locking and release device 42. The floating body 12 is anchored to the bottom foundation 40 via at least four anchoring wires 14, which are detachably mounted on the bottom side of the second floating body 12 via the openable lock coupling 42. A drawback with said anchorage is the placement of the lock couplings 42 on the bottom side of the floating body 12, which makes the release of the anchoring wires 14 more difficult. In order to prevent instability from arising or to prevent the floating body 12 from tilting in severe weather, the lock couplings 42 are arranged so that they are spaced at an equal distance apart. The anchoring wires 14 are made of a corrosion-resistant material, preferably a synthetic material, e.g. nylon. Alternatively, a rust-proof metallic material is used.

In a second embodiment of the anchorage of the floating body 12 to the sea bed, one end of the anchoring wire 14 is fixed to the bottom side of the floating body 12, whence the wire 14 runs to a clamp 41 on the bottom foundation 40 and from there onward to the bottom side of the floating body 12, via a guide hole 37 in the vertical direction through one of the floating sections 33 of the floating body 12, and onward up to the top side of the floating body 12. On the top side of the floating body 12, the anchoring wire 14 is detachably fastened onto fixedly arranged fastening rings or fastening pins via, for example, a bowline hitch or a double half hitch 38, FIGS. 4 and 5.

The bottom foundation 40 is preferably constituted by a concrete block, but can also be a plastics or metal sack or net which is filled with macadam. A sack/net filled with thirty metric tons of macadam, with a density of about 2 kg/dm$^3$, corresponds to an anchoring force of approximately 150,000 N, which is more than sufficient to securely anchor a small to medium-sized wave power station with a buoyancy of 30,000 N.

Figure 6:
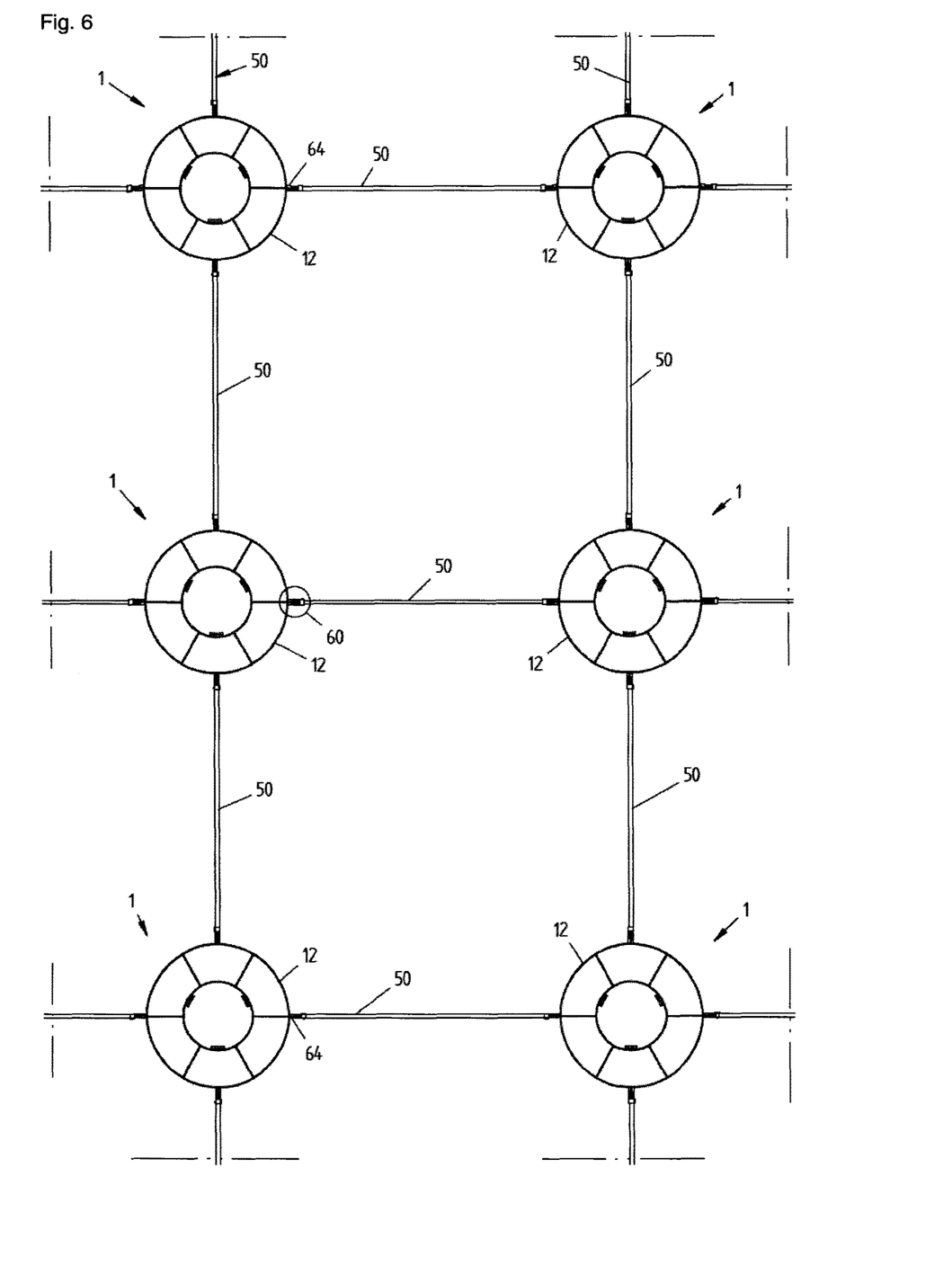
FIG. 6 shows schematically a view of a wave power system, viewed from above, comprising at least six wave power station units coupled together via watertight pipe joints, comprising electric cables and compressed air lines, and via flexible pipe couplings.

The wave power station 1 is designed to be able to be easily coupled together with other wave power stations 1 to form larger or smaller wave power systems. FIG. 6 shows a wave power system comprising six wave power stations 1 coupled together with flexible pipe joints 50.

Figure 7:
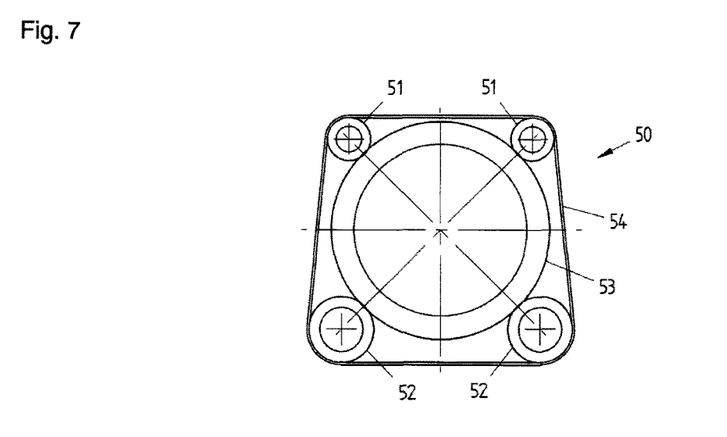
FIG. 7 shows schematically a cross section of a pipe joint according to FIG. 6, wherein mutual placement of compressed air lines and electric cables in the pipe joint can be seen.

FIG. 7 shows a cross section of a pipe joint 50 according to FIG. 6, in which the structure of the pipe joint 50 can be seen. The pipe joint 50 is made up of an inner flexible core 53, preferably constituting a flexible pipe, on which electric cables 51 and compressed air lines 52 are arranged. The inner flexible pipe has a circular cross section and comprises an elastic plastics material, for example in the form of polyethylene.

Via the electric cables 51, it is possible to transmit electric current firstly between the wave power stations 1, and secondly from a wave power station 1 to a commercial electricity supply network. Alternatively, electric current can be transmitted from one or more wave power station(s) to an external storage unit for intermediate storage of larger quantities of electric power. Correspondingly, the compressed air lines 52 can be used for transfer of compressed air between different wave power stations 1, in order to even up variations in compressed air production between individual wave power stations, or for transfer from one or more wave power station(s) 1 to a commercial compressed air supply network. Alternatively, compressed air can be transferred from one or more wave power station(s) 1 to an external storage unit for storage of larger quantities of compressed air.

The electric cables 51 and compressed air lines 52 respectively are mounted and fixed in specific positions on the surface of the inner flexible core 53 by stretching of an outer watertight plastics or metal cloth 54 around the electric cables 51, the compressed air lines 52 and the inner flexible core 53, FIG. 7.

In an alternative embodiment, the plastics or metal cloth 54 can be replaced by a flexible outer tube (not shown) with corresponding function to the plastics or metal cloth 54.

Figure 9:
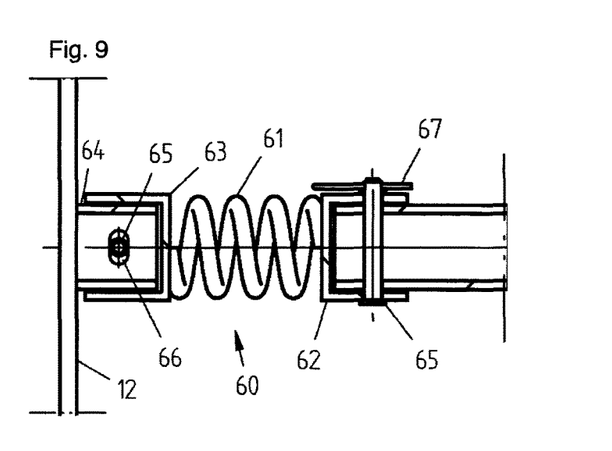
FIG. 9 shows schematically an axial section, viewed from the side, of an alternative embodiment of the pipe coupling according to FIG. 8.

The pipe joint 50 is connected to a pipe end 64 arranged on the side of the second floating body 12 via a flexible pipe coupling 60, FIGS. 6,8 and 9.

The flexible pipe coupling 60 comprises two coupling sleeves 63,62, a first coupling sleeve 63 for connection to the pipe end 64 on the second floating body 12 and a second coupling sleeve 62 for connection to the end of the pipe joint 50. The two coupling sleeves 63, 62 are fixedly mounted on either end of an elastic helical spring 61.

To the flexible pipe coupling 60 are also fitted two lock bolts 65, a first lock bolt 65 for locking the first coupling sleeve 63 to the pipe end 64 and a second lock bolt 65 for locking the second coupling sleeve 62 to the end of the pipe joint 50. The lock bolts 65 are detachably mounted in guide holes 66, firstly through the first coupling sleeve 63 and the pipe end 64 and secondly through the second coupling sleeve 62 and the end of the pipe joint 50. The guide holes 66 are configured, in the form of slots or so-called long holes, to allow small movements, i.e. a certain freedom of movement between the pipe joints 50 and the floating bodies 12, in the event of movements in the wave power stations 1 caused by the wave movements of the ocean or sea.

Figure 10:
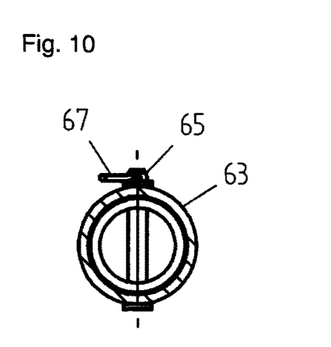
FIG. 10 shows schematically an axial section, viewed from the side, of the bushing of the locking pin in the pipe coupling according to FIG. 9.

Following mounting of the lock bolts 65 in the guide holes 66, the lock bolts 65 are locked with the aid of locking pins 67, which are movably arranged in transverse holes in the outer parts of the lock bolts 65.

The invention is not limited to the above preferred embodiments, but can be varied in different ways within the scope of the patent claims.

The invention claimed is:

1. A wave power station for conversion and storage of wave energy from ocean or sea waves, which wave power station comprises an energy absorbing unit comprising a first floating body connected to a vertically hanging counterweight via a drive line and a drive wheel, a power generating unit comprising at least one power generation unit, for conversion of wave energy, connected to a drive shaft, and a power accumulating unit comprising at least one power accumulator for storage of converted wave energy, wherein the power generating unit and the power accumulating unit are arranged in a central cavity in a toroidal second floating body firmly anchored under the first floating body, wherein the drive line is connected to the at least one power generation unit via the drive wheel and a coupling and transmission unit arranged on the drive shaft for driving of the at least one power generation unit, wherein the at least one power generation unit comprises two opposite-acting electric generators, with opposite direction of rotation relative to each other, arranged on the drive shaft, for alternate generation of electric current via the up and down movements of the drive line in time with the wave movements, wherein the drive shaft, the drive wheel, the switching and transmission unit, the at least one power generation unit and the at least one power accumulator are arranged in a container in the central cavity of the toroidal second floating body, and wherein the at least one power accumulator comprises at least two chargeable battery cells for storage of electric current from the two opposite-acting electric generators.

2. The wave power station as claimed in claim 1, wherein the drive shaft, the coupling and transmission unit and the drive wheel are arranged in a bearing housing, fixedly mounted in the container.

3. The wave power station as claimed in claim 1, wherein the container is loosely arranged and rests on a seat disposed on the lower part of the inner envelope surface of the central cavity, via a flange on the lower end of the container.

4. A wave power station for conversion and storage of wave energy from ocean or sea waves, which wave power station comprises an energy absorbing unit comprising a first floating body connected to a vertically hanging counterweight via a drive line and a drive wheel, a power generating unit comprising at least one power generation unit, for conversion of wave energy, connected to a drive shaft, and a power accumulating unit comprising at least one power accumulator for storage of converted wave energy, wherein the power generating unit and the power accumulating unit are arranged in a central cavity in a toroidal second floating body firmly anchored under the first floating body, wherein the drive line is connected to the at least one power generation unit via the drive wheel and a coupling and transmission unit arranged on the drive shaft for driving of the at least one power generation unit, wherein the drive shaft, the drive wheel, the switching and transmission unit, the at least one power generation unit and the at least one power accumulator are arranged in a container in the central cavity of the toroidal second floating body, and wherein the at least one power generation unit is constituted by two opposite-acting compression pumps for compression of air.

5. The wave power station as claimed in claim 4, wherein the at least one power accumulator is constituted by three outer pressure vessels for storage of compressed air, wherein the three outer pressure vessels are arranged in the toroidal part of the second floating body.

6. The wave power station as claimed in claim 5, wherein the three outer pressure vessels comprise watertight elastic inner pressure vessels for storage of the compressed air.

7. The wave power station as claimed in claim 5, wherein the three outer pressure vessels are separated from one another by three floating containers, comprising floating elements, comprising cellular plastic.

8. The wave power station as claimed in claim 1, wherein the drive line is rotatably mounted on the bottom side of the first floating body via a rotating coupling.

9. The wave power station as claimed in claim 1, wherein the second floating body is firmly anchored to a bottom foundation on the ocean bed or sea bed via at least one anchoring wire.

10. The wave power station as claimed in claim 9, wherein one end of the anchoring wire is fixedly arranged on a first point of attachment on the bottom side of the second floating body, and the other end is detachably arranged on a second point of attachment disposed on the top side of the second floating body, wherein the anchoring wire runs from the first point of attachment to the second point of attachment via an eye bolt disposed on the concrete foundation and via a guide hole in one of the floating containers.

* * * * *